Sept. 25, 1951  A. E. SCHALLOCK  2,568,827
WHEELED BUMPER JACK
Filed Dec. 16, 1949  2 Sheets-Sheet 1
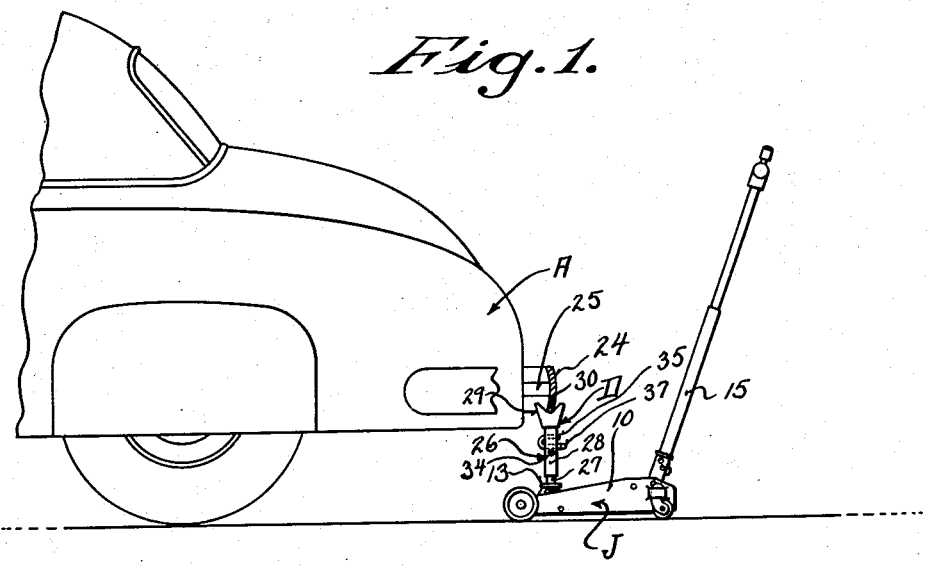
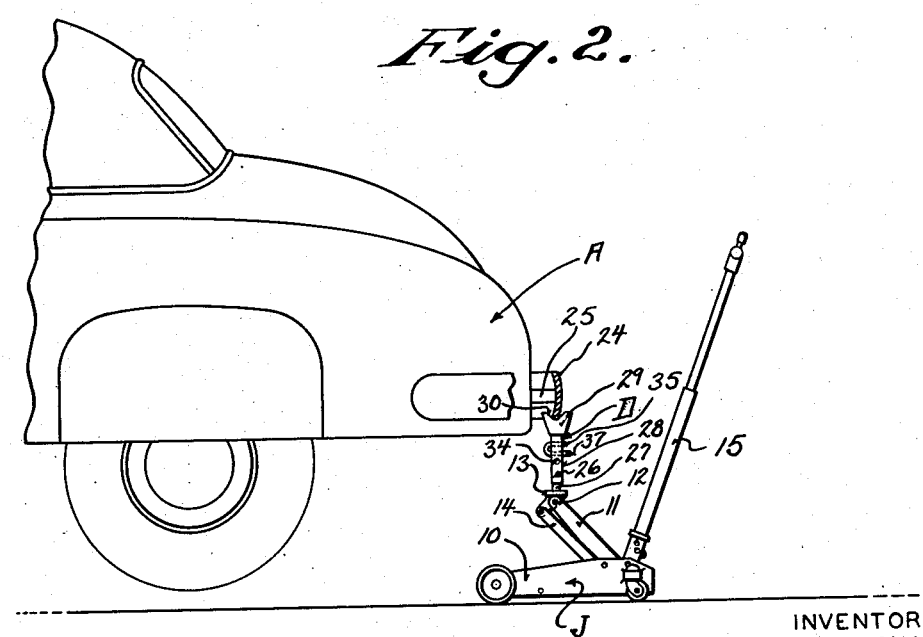
INVENTOR
ARTHUR E. SCHALLOCK
BY
ATTORNEYS Sept. 25, 1951     A. E. SCHALLOCK     2,568,827
WHEELED BUMPER JACK
Filed Dec. 16, 1949     2 Sheets-Sheet 2
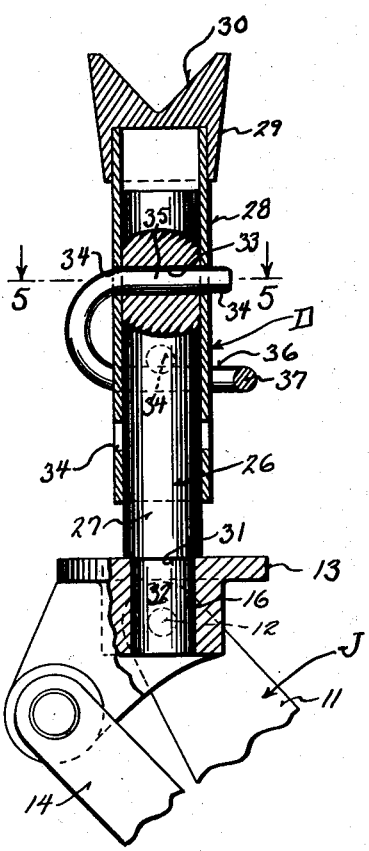
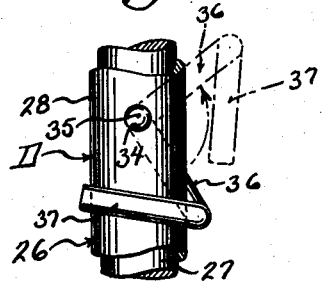
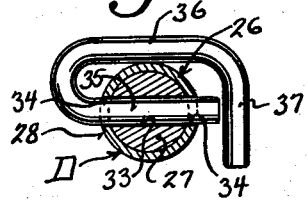
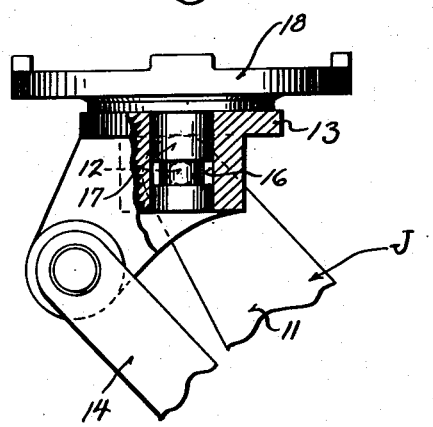
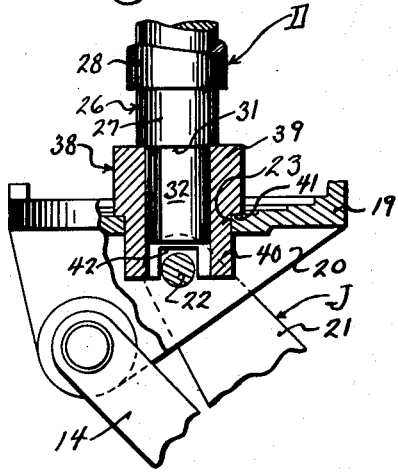
INVENTOR
ARTHUR E. SCHALLOCK
BY
ATTORNEYS Patented Sept. 25, 1951

2,568,827

UNITED STATES PATENT OFFICE 2,568,827

WHEELED BUMPER JACK

Arthur E. Schallock, Sheboygan, Wis., assignor to American Hydraulics, Inc., Sheboygan, Wis., a corporation Application December 16, 1949, Serial No. 133,250

2 Claims. (Cl. 254—133)

This invention appertains to jacks of the type embodying a wheeled frame for movement under automobiles and commonly referred to as garage or curb service jacks.

Such jacks include a swinging lift arm and saddle for engaging the differential housing or axle of automobiles for lifting the wheels of the vehicle off of the ground. The jacks are built low so as to permit the same to be conveniently rolled under the car chassis. In modern cars with enclosed rear wheels, it often becomes necessary (in removing rear wheels or placing chains thereon) to raise the car from the bumper or bumper brackets. In such instances, the body must be raised a considerable distance (due to springing) before the wheels leave the ground. In order to reach the bumpers or brackets, the lift arm and saddle have to be elevated a considerable distance before the starting of the raising of the body and to such a distance that the lift arm does not have a sufficient further movement to raise the car body and the wheels off of the ground.

It is, therefore, one of the primary objects of the invention to provide means whereby curb service jacks can be effectively and successfully used for lifting cars from their bumpers or bumper brackets.

Another salient object of the invention is to provide a novel attachment for use with standard curb service jacks for permitting the instant engaging of the jack with the bumper or bracket, so that as soon as the lift arm starts its upward movement the car will be raised therewith.

A further object of the invention is the provision of a novel standard for detachable connection with the lift head or saddle of a curb service jack having means for receiving and engaging a bumper or bumper bracket, the standard functioning to engage the bumper or bumper bracket when the lift arm is in its extreme lowered position and before operation of the jack.

A further important object of the invention is the provision of novel means for adjusting the active height of the standard so as to permit the engagement of the standard with bumpers of different characters of cars and various heights of bumpers on different makes of cars.

A still further object of the invention is the provision of novel and simple means for holding the standard in its desired adjusted position, so that accidental displacement of the adjustment desired during the raising or lowering of the car will be prevented.

A still further object of the invention is to provide means whereby the standard can be used on various makes and characters of curb service jacks, without any structural changes in such jacks.

A still further important object of the invention is to provide a novel device of the above character which will be durable and efficient in use, one that will be simple and easy to manufacture and one which can be placed upon the market at a low cost and quickly and easily associated with standard jacks.

With these and other objects in view, the invention consists in the novel construction, arrangement and formation of parts, as will be hereinafter more specifically described and claimed and illustrated in the accompanying drawings, in which drawings, Figure 1 is a side elevational view of a curb service jack showing the novel device associated therewith and engaging the rear bumper of a car, just prior to the starting of the operation of the jack.

Figure 2 is a view similar to Figure 1, but showing the jack after operation and the lifting of the car body and wheels.

Figure 3 is an enlarged fragmentary, side elevational view, partly in section, showing the novel attachment associated with the lift head of a curb service jack and with the saddle removed from the head.

Figure 4 is a fragmentary, side elevational view of the attachment looking at right angles from Figure 3, and illustrating the latch pin for the telescoping parts of the attachment in its locked position in full lines and in its releasing position in dotted lines.

Figure 5 is a horizontal sectional view taken on the line 5—5 of Figure 3, showing the novel latch pin in its locking position.

Figure 6 is a view similar to Figure 3, but showing the novel appliance removed from the lift head and with the usual saddle associated with said lift head.

Figure 7 is a fragmentary side elevational view partly in section, illustrating a type of jack in which the saddle is formed integral with the lift head and illustrating the use of an adapter for engaging this type of saddle and lift head for receiving and supporting the lifting device.

Referring to the drawings in detail, wherein similar reference characters designate corresponding parts throughout the several views, the letter J generally indicates a curb service jack of a type now commonly found in the open market and consequently, the same will not be described in minute detail.

As illustrated, the same includes a wheeled frame 10 having pivotally mounted thereon, for swinging movement to a raised elevated position and to a lowered inoperative position within the frame, a lift arm 11. Pivotally mounted to the outer end of the lift arm by trunnion pins 12 is the lift head 13 and the head is normally maintained in a horizontal work engaging position by links 14 pivotally connected to the head 13 and the frame 10. A removable extension handle 15 is provided for manipulating the jack into position and for actuating the hydraulic ram (not shown) for the lift arm 11. In one particular type of curb service jack, usually in that type of jack having rear caster wheels, the lift head 13, is provided with an axial bore or socket 16 for the reception of the shank 17 of a lift saddle 18. In another from of jack, usually in the straight wheel type (not shown), a saddle 19 is formed integral with a lift head 20 and the lift arm 21 (see Figure 7) is pivotally connected to the head by a cross pivot pin 22. The saddle 19 is provided with an opening 23. The pivot pin 22 extends below and diametrically across this opening. This figure will be later referred to in detail.

As shown in Figure 1 of the drawings, the lift head 13 in its lowered inoperative position is a considerable distance below the rear bumper 24 of an automobile A and consequently, the lift head has to be raised a material distance in order to engage the head with the bumper. In accordance with this invention, a novel device D is utilized for detachable association with the lift head and for engaging the bumper 24 or its bracket 25, when the lift arm is in its lowered position.

The device D comprises an upright standard 26 preferably including telescoping upper and lower sections 27 and 28. The lower section 27 consists of a solid post and the upper section 28 consists of a sleeve or piece of tubing slidably mounted over the post. The upper end of the sleeve or section 28 carries a head 29 for engaging a car bumper 24, or bracket 25. The head 29 is provided with a V-shaped socket or recess for receiving the bumper so that the slipping of the bumper from off of the head will be eliminated. The lower end of the section 27 is reduced in diameter to form a stop shoulder 31 and a shank 32. This shank 32 is of a size for snug reception within the socket 16 of the lift head 13 and obviously the saddle 18 of the conventional jack is removed when the standard is associated with the lift head. The shoulder 31 limits the downward movement of the shank 32 in the lift head.

By having the upper section or sleeve 28 slidably mounted on the post or lower section 27, the active height of the standard can be regulated and means is provided for holding the standard in a selected, adjusted position. As clearly shown in Figures 3, 4 and 5, the post or lower section 27, is provided with a diametrically extending opening 33, and the sleeve at different points is provided with aligned openings 34. Selected aligned openings 34 can be brought into registration with the opening 33 and by inserting a pin 35 therein movement of the upper and lower sections relative to one another, is prevented. The pin 35 is of a novel form, so as to prevent accidental displacement thereof from selected openings and to facilitate the manipulation of the pin. The pin 35 is provided with a bent back portion 36, which parallels the pin and the outer end of the bent back portion 36 is provided with a manipulating handle 37, which also performs the function of a lock. The weight of the bent back portion 36 and the handle 37 functions to normally hold the bent back portion 36 and the handle 37 in a lowered position, as is clearly shown in Figures 3 and 4, and when the handle is in this position, movement of the pin 35 laterally in selected openings is prevented. To remove the pin 35, it is merely necessary to lift up the handle 37 until the same assumes a position at one side of the standard (see dotted lines in Figure 4) after which the same can be pulled out of the registering openings.

In use of the jack and the novel device D the saddle plate 18 is removed from the lift head 13 and the shank 32 of the standard 26 is inserted within the socket 16 of the lift head. The jack is now wheeled in its lowered position under the bumper. The pin 35 is then removed and the upper section or sleeve 28 is slid on the lower section or post 27 until the head 30 engages the bumper or the bumper bracket, as the case may be, after which the same is inserted in the closest openings 34 and 33. The jack is now ready for manipulation and the same is operated in the ordinary way. Upon the initial raising of the lift arm 33, the car body will be instantly raised therewith and consequently the automobile will be started to elevate as soon as the jack is manipulated.

Referring back to Figure 7 and to that type of jack in which the saddle is integral with the head 29 and the pivot pin extends entirely across the head, it is proposed to use an adapter 38 with the device D. The adapter 38 merely includes a collar 39 having its lower end reduced to form a shank 40 and a stop shoulder 41. The lower end of the collar is notched, as at 42, and the collar forms a socket for receiving the shank end 32 of the standard 26. In use of the device D with a jack having the integral saddle, the shank portion 40 of the adapter is inserted in the opening 23 of the saddle and the notch 42 receives the cross pivot pin 22, and the lower end of the standard can be inserted in the adapter. Obviously, the standard itself can be shaped to be received in the opening 23 should the use of an adapter be undesirable.

From the foregoing, it can be seen that an exceptionally simple and durable device has been provided so that an ordinary curb service jack can be utilized for lifting automobiles, both from their differential housing or axle and from the bumper or bumper bracket.

Changes in details may be made without departing from the spirit or the scope of this invention, but what I claim as new is:

1. In an automobile jack of the type including a lift arm and a lift head, an integral saddle provided with an axial opening and a cross pin pivotally connecting the head to the lift arm, a vertically disposed standard having a reduced lower end, and an adapter receiving said reduced lower end received in the opening in the head and having notches for receiving the cross pivot pin.

2. As a new article of manufacture an attachment for jacks of the type having a swinging lift arm and a lift head pivotally connected thereto having an upper face normally disposed in a horizontal plane comprising a vertically disposed standard adapted to detachably engage said head; a lift head on the standard shaped to engage an automobile bumper and bumper bracket, said standard including a lower post section and an upper sleeve section slidably mounted on the post section, means holding said sections in a selected adjusted position, said means including a latch pin, the post section and sleeve section having registering openings for receiving the pin, a bent back portion on said pin arranged in parallel relation therewith and an angularly extending handle on said bent back portion normally lying at one side of the standard.

ARTHUR E. SCHALLOCK.

REFERENCES CITED

The following references are of record in the file of this patent:

UNITED STATES PATENTS

| Number | Name | Date |
|---|---|---|
| 1,650,810 | Weaver | Nov. 29, 1927 |
| 1,905,624 | Divork | Apr. 25, 1933 |
| 2,029,022 | Graham | Jan. 28, 1936 |
| 2,054,555 | Cochin | Sept. 15, 1936 |
| 2,184,061 | Skroback | Dec. 19, 1939 |
| 2,370,681 | Mueller | Mar. 6, 1945 |